(12) United States Patent
Ajay et al.

(10) Patent No.: US 12,620,294 B2
(45) Date of Patent: May 5, 2026

(54) SENSING SYSTEM FOR FIRE EVENT DETECTION

(71) Applicant: Honeywell International Inc., Charlotte, NC (US)

(72) Inventors: Kemal Ajay, Mount Waverley (AU); Deepakumar Subbian, Féchy (CH); Ronald Knox, Mount Eliza (AU)

(73) Assignee: Honeywell International Inc., Charlotte, NC (US)

( * ) Notice: Subject to any disclaimer, the term of this patent is extended or adjusted under 35 U.S.C. 154(b) by 71 days.

(21) Appl. No.: 18/215,455

(22) Filed: Jun. 28, 2023

(65) Prior Publication Data

US 2025/0006031 A1     Jan. 2, 2025

(51) Int. Cl.
| | |
|---|---|
| G08B 17/10 | (2006.01) |
| G01S 17/08 | (2006.01) |
| G01S 17/894 | (2020.01) |
| G08B 17/107 | (2006.01) |

(52) U.S. Cl.
CPC ............ G08B 17/107 (2013.01); G01S 17/08 (2013.01); G01S 17/894 (2020.01)

(58) Field of Classification Search
CPC ...... G08B 17/107; G01S 17/08; G01S 17/894
See application file for complete search history.

(56) References Cited

U.S. PATENT DOCUMENTS

| | | | | |
|---|---|---|---|---|
| 10,161,866 | B2 * | 12/2018 | Knox ..................... | G08B 25/10 |
| 11,551,535 | B1 | 1/2023 | Knox | |

| | | | | |
|---|---|---|---|---|
| 11,657,692 | B1 | 5/2023 | Knox et al. | |
| 2004/0239912 | A1 | 12/2004 | Correia et al. | |
| 2010/0194574 | A1 | 8/2010 | Monk et al. | |
| 2012/0081544 | A1 | 4/2012 | Wee | |
| 2018/0286073 | A1 | 10/2018 | Kirmani et al. | |
| 2021/0183139 | A1 * | 6/2021 | Richert ................... | G06T 5/50 |
| 2023/0124927 | A1 * | 4/2023 | Ezra ...................... | A62C 31/28 |
| | | | | 169/61 |
| 2023/0133038 | A1 | 5/2023 | Knox et al. | |
| 2023/0138573 | A1 | 5/2023 | Knox | |
| 2024/0087254 | A1 * | 3/2024 | Juarez .................. | H04W 4/029 |

FOREIGN PATENT DOCUMENTS

| | | |
|---|---|---|
| KR | 20210081262 A | 7/2021 |
| KR | 20220074246 A | 6/2022 |
| WO | 2022007997 A1 | 1/2022 |

* cited by examiner

*Primary Examiner* — Davetta W Goins
*Assistant Examiner* — Sharmin Akhter
(74) *Attorney, Agent, or Firm* — Brooks, Cameron & Huebsch, PLLC

(57) ABSTRACT

Systems, methods, and devices of providing a sensing system for fire event detection in a space within a facility are described herein. One method, includes activating a physical sensor of a physical alarm system detector device to monitor a space of a facility for a fire event to occur, defining a virtual voxel structure mapped in at least three dimensions to a virtual monitored space created to represent the space of the facility being monitored, and locating a virtual object within the virtual voxel structure by mapping a virtual object location based on sensing a location of a physical object with the physical sensor within the space.

13 Claims, 5 Drawing Sheets

$$d = \frac{ct}{2}$$

SENSING SYSTEM FOR FIRE EVENT DETECTION

TECHNICAL FIELD

The present disclosure relates to systems, methods, and devices of providing a sensing system for fire event detection.

BACKGROUND

Facilities equipped with fire alarm systems allow for early detection of a fire event, such as a fire within a building. Typically, such facilities are large and can be complex (e.g., large building, multiple floors, facilities with multiple buildings) and such alarm systems allow for firefighting personnel to arrive more quickly.

The systems utilize specialized fire/smoke sensing devices (e.g., fire detectors that detect heat and/or smoke detectors that detect smoke particles to detect fires) spread throughout the facility that can detect when a fire may be occurring. These alarm system devices communicate sensor information to an on premise alarm system control panel that collects and analyzes the data to determine whether a fire event is occurring, and contacts emergency personnel to come to the facility to deal with the fire.

DETAILED DESCRIPTION

Figure 1:
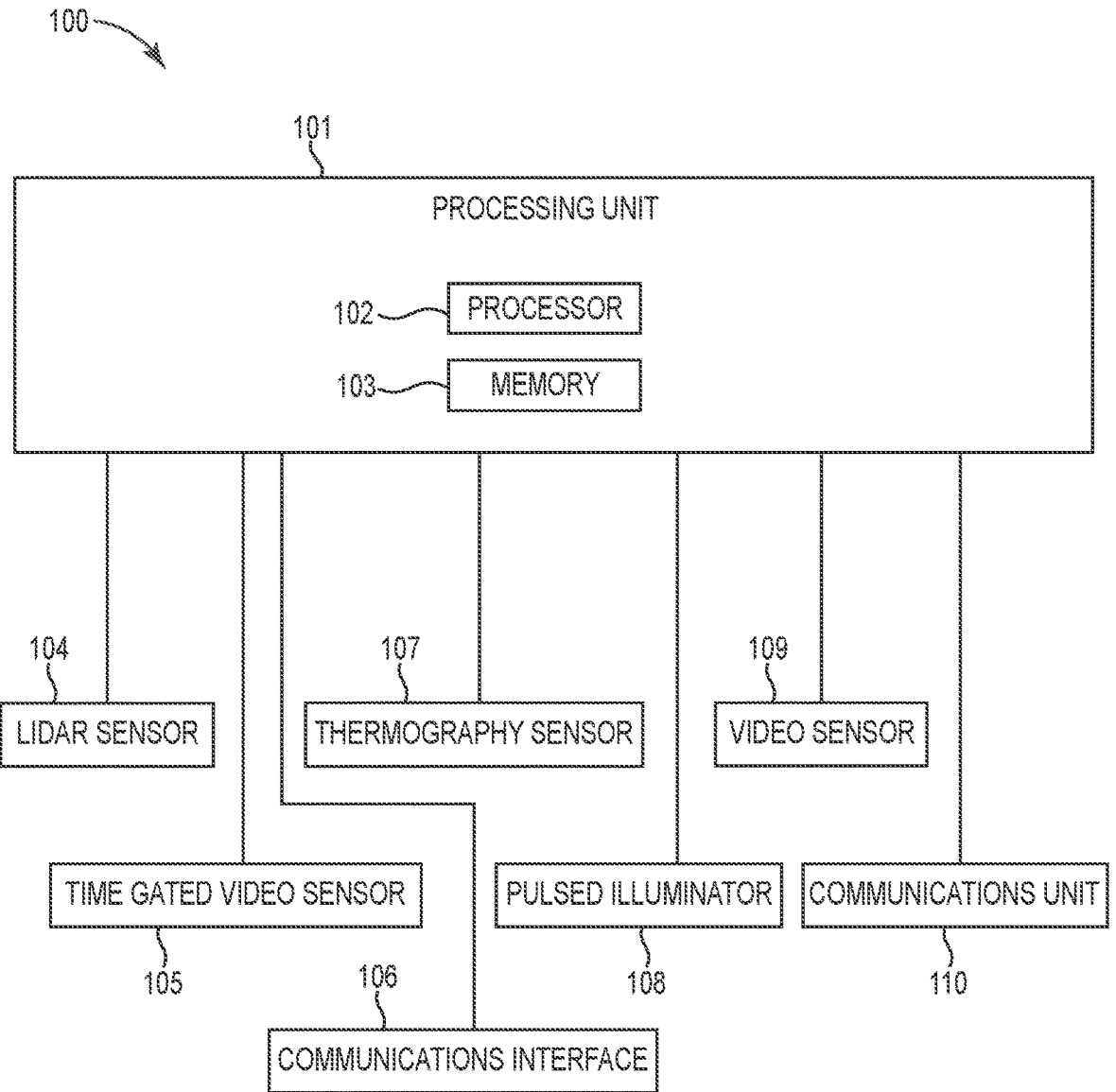
FIG. 1 is an example of a fire/smoke alarm system detector device accordance with one or more embodiments of the present disclosure.

Embodiments of the present disclosure provide multi-dimensional information that can be used, for example, to provide location and distance to smoke and thermal events. Some embodiments combine aspects of three-dimensional (3D) range sensing, 3D smoke detection using LiDAR (light detection and ranging technology), thermography, and object detection.

The embodiments of the present disclosure provide rich situational awareness data to enable rapid, focused response to threats such as smoke, fire, and intrusion. Further, by combining data types (e.g., 3D voxel location, smoke intensity, temperature) the system can support optimum decision making to minimize the chance of loss of life or damage to assets.

Some embodiments include a LIDAR-based system component for measuring and/or mapping an environment in 3D. An enhanced LiDAR system can, for example, be capable of detecting back-scatter from smoke.

A thermography system component can be used to cover at least some of the same physical environment. A thermography sensor can, for example, identify the temperature of an object or if an object is hot, but not yet creating smoke. For example, a room may have an electric motor driving a piece of equipment and the motor gets hot during operation. A thermography sensor can determine the temperature of and identify such an object.

Additionally, or alternatively, a video camera (video imaging sensor) can be used to cover at least some of the same environment, for example, the video camera can be an enhanced video camera system component which is, for example, capable of detecting smoke plumes.

Further, the LiDAR component may be replaced by a 'structured light' triangulation system in some embodiments to provide the functionality provided by the LiDAR component (e.g., detect back-scatter from smoke). In some embodiments, the LiDAR may, for example, be a mechanically scanned beam or, in other embodiments, may be replaced by the time-gated (time-of-flight) camera.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 334 may reference element "34" in FIG. 3, and a similar element may be referenced as 434 in FIG. 4.

As used herein, "a", "an", or "a number of" something can refer to one or more such things, while "a plurality of" something can refer to more than one such things. For example, "a number of sensors" can refer to one or more sensors, while "a plurality of sensors" can refer to more than one sensor.

FIG. 1 is an example of a fire/smoke alarm system detector device in accordance with one or more embodiments of the present disclosure. The fire/smoke alarm system detector device 100 of FIG. 1 includes a processing unit 101 that includes a processor 102 and memory 103. The processor processes executable instructions stored in memory.

The memory includes executable instructions and data used by the executable instructions, received from other system devices and/or other non-system devices, and/or derived from execution of the executable instructions. For instance, the voxel information (e.g., data and instructions to form the voxel and/or interpret the data), location information (e.g., data and instructions to derive the location and/or interpret the data), and/or distance information (e.g., data and instructions to derive the distance from a sensor and/or interpret the data) can be stored in memory. The processing unit 101 can, for example, be a computing device, such as a desktop or laptop computer or a computing device used as an alarm system control panel.

Alarm systems of the present disclosure can include a number of sensor devices to accomplish the functions described herein. For example, the system 100 of FIG. 1 includes a LIDAR sensor 104, a time gated video sensor 105, a communications interface 106, a thermography sensor 107, a pulsed illuminator 108, a video sensor 109, and a communications unit 110.

The LiDAR sensor 104 can, for example, be used to measure the distance to an object in a space (e.g., a room) within a building and, in some implementations, can include measuring the distance to the walls and/or corners of the space. The wall and/or corner measurements can, for example, be used to create a virtual space that corresponds to the physical space measured with the LIDAR sensor. LiDAR sensors can also be utilized to identify a distance and location of smoke in the room.

The time gated video sensor 105 can, for example, be used in conjunction with the pulsed illuminator 108 so that coordination of the pulse light round trip time with the activation of an optical shutter in the receiving video sensor 109 (e.g., that detects smoke plumes and/or flames) enhances the sensitivity to objects, such as smoke plumes, at a particular distance to help distinguish them from the background.

The communications interface 106 is representative of components within the system 100 that provide any necessary communication links to access and/or store data and/or executable instructions. These, for example, include devices that provide wireless, optical fiber, or Ethernet connections to and/or from system devices. The communication unit 110 manages communications between multiple sensor devices and an alarm system monitoring station at the control panel or outside the alarm system. For example, the communication unit 110 can transmit as a complete voxel array data set to a separate monitoring system (e.g., an alarm system monitoring station) which will interpret the significance of the contents of the voxel array (virtual voxel structure shown in FIG. 1).

Figure 2:
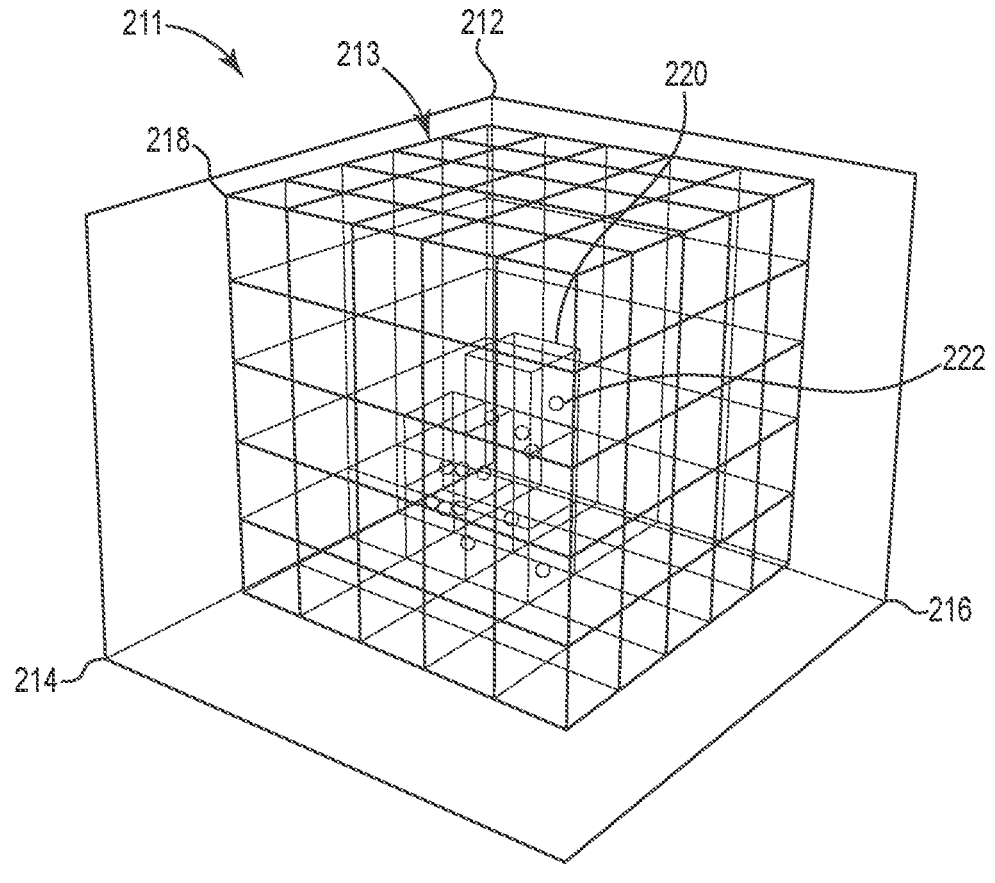
FIG. 2 is a three-dimensional voxel visualization in accordance with one or more embodiments of the present disclosure.

FIG. 2 is a three-dimensional voxel visualization in accordance with one or more embodiments of the present disclosure. The voxel visualization can be viewed by a user on a display or can be a digital construct that is not visible to a user, but usable by a computing device as if it had been visually viewed. The voxel visualization can be used in the monitoring of a space within a building to determine whether an object of interest is present in the space and the object's status (e.g., size, location, and/or movement) can be determined and, in some embodiments, tracked over time. An object of interest can be any parameter that can be sensed remotely by any of the sensors of the system, such as color, reflectivity, temperature, gas concentration, velocity, acceleration, particle or smoke concentration, etc.

Each voxel can be thought of as multi-dimensional. A voxel is a measurement of volume in a structure that is to be imaged. It is preferrable that voxels are cubes, to easily determine the dimensions of the voxel structure and the locations of any objects therein. Each voxel represents a defined volume and can be localized by coordinates on a three-dimensional grid. As used herein, a voxel is described by its location in space (e.g., three dimensions) as well as having the dimension of time; that being the time at which the voxel data was sensed by a sensor of the detection system, assuming that the fire/smoke detector device samples the environment periodically. Further, each voxel can be linked to a list of objects of interest, as described above. A virtual voxel structure is a structure composed of multiple voxels.

In FIG. 2, a portion of a space 211 (where data is collected by one or more sensors) is illustrated that shows three junctions between surfaces (e.g., walls, floor, ceiling (not shown or used in this example, but could be used)) 212, 214, 216 and a matrix 218 of adjacent defined areas 213 within the space 211. The creation of a virtual voxel structure is based on data associated (i.e., collected by the detector device or stored in memory by a technician or administrator) with the actual physical space that is being monitored by the physical alarm system detector device providing the data.

One method for creating a virtual voxel structure includes activating a physical sensor of a physical alarm system detector device (located in or adjacent to the space being monitored) to monitor a space of a facility for a fire event to occur, defining a virtual voxel structure mapped in at least three dimensions (e.g., x, y, z) to a virtual monitored space created to represent the space of the facility being monitored, and locating a virtual object within the virtual voxel structure by mapping a virtual object location based on sensing a location of a physical object with the physical sensor within the space.

As used herein, mapping is simulating a physical location in an actual physical space in a virtual environment where the space and object may be of a different scale than the actual space and object, but where the relation of scale between the physical space and physical object and the virtual space and virtual object are the same. For example, the virtual space and virtual object may both be scaled down by a factor of 30 to the physical space and physical object, thereby making the virtual environment relatable to the physical environment, such that the information provided by the voxel structure provides accurate object location and movement. This can be beneficial for example, where the space is monitored over time and the location of the virtual object can be adjusted based on a sensed change in the location of the physical object.

When an object of interest 222 is detected, certain defined areas 220 can be identified and selected that contain an object of interest. Objects of interest can be, for example, smoke, flame, hot objects, people and/or animals. Objects of interest can be identified by their color, reflectivity, temperature, gas concentration, and/or smoke concentration. Other information of interest can, for example, include movement of the object of interest.

Figure 3:
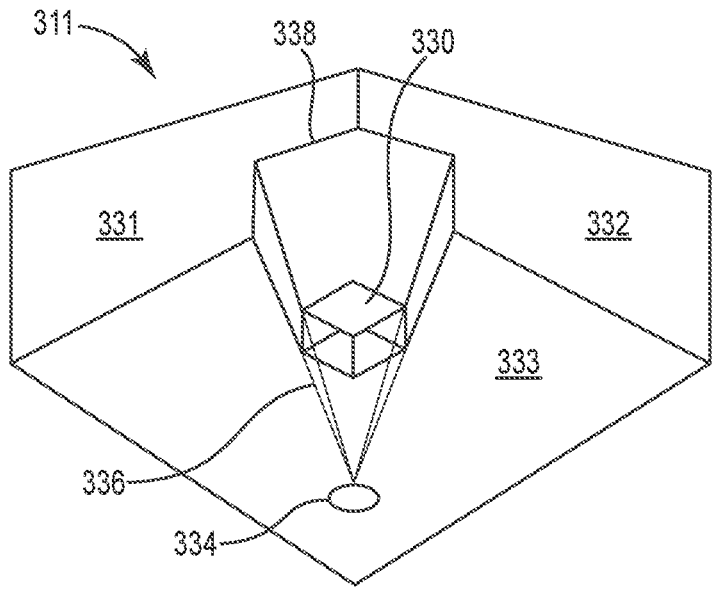
FIG. 3 is an example of a single detector of a fire alarm system in a space within a building having an object obscuring the sensing field in accordance with one or more embodiments of the present disclosure.
Figure 4:
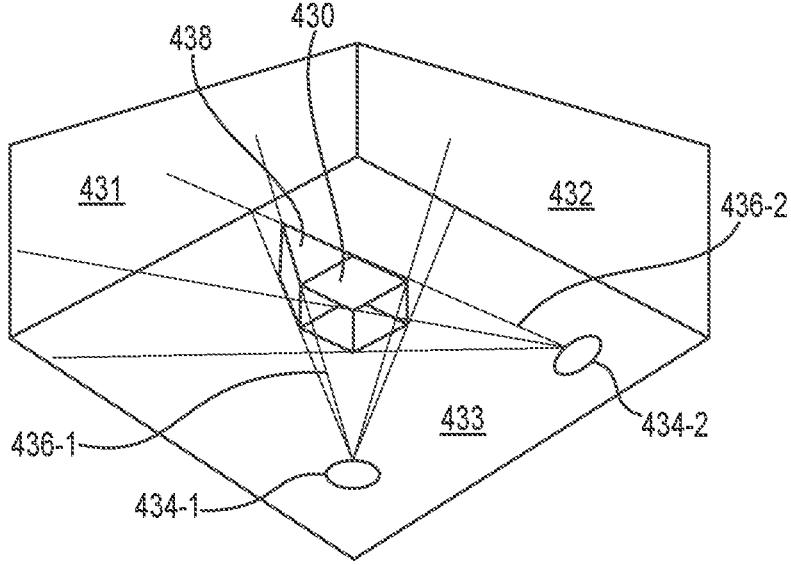
FIG. 4 is an example of multiple detectors of a fire alarm system in a space within a building having an object obscuring the sensing field in accordance with one or more embodiments of the present disclosure.

This information can be helpful in identifying a location of a fire event, the scale of the fire, and if monitored over time, the growth of the fire, its direction of growth, recommended evacuation routes, and other helpful information. As the object changes, more or different defined areas 213 can be identified that are being affected by the object (e.g., object is present, effected by heat or some other object effect. Object information can be obtained by one or more sensors. FIGS. 3 and 4 provide some examples of detector configurations that may be utilized.

To create a voxel structure as shown, the computing device doing the creation can, for example, collect data from each detector whose data is being used and identifies landmarks within the detector's field of view. If more than one detector is used, common landmarks can be identified and the location of the landmark can be determined by transforming the data from one detector into a coordinate system that is compatible with the first detector or vice versa. Then, the data sets can be overlaid and the location data is complimentary.

FIG. 3 is an example of a single detector of a fire alarm system in a space within a building having an object obscuring the sensing field in accordance with one or more embodiments of the present disclosure. Although using a single detector is cost effective, when a single detector 334 is used to monitor an area (here bounded by walls 331 and 33 and floor 333), there is the likelihood that a nearby object 330 will occlude the volume of space 338 behind it making it impossible to sense the content of voxels in the occluded volume 338. This is important to note because if there are thermal or other events, they will be visible only in region 336 and will not be visible to the detection system in region 338 and therefore will not be reported.

One embodiment of an alarm system such as that illustrated in FIGS. 3 and 4 includes a number of event detection devices having a number of sensors configured to detect an event within a facility, and an alarm system control panel configured to receive information about the event or event detection devices and transmit the information to a computing device. The computing device is configured to activate a physical sensor of a physical alarm system detector device to monitor a space of a facility for a fire event to occur, define a virtual voxel structure mapped in at least three dimensions to a virtual monitored space created to represent the space of the facility being monitored, and locate a virtual object within the virtual voxel structure by mapping a virtual object location based on sensing a location of a physical object with the physical sensor within the space.

As discussed above, in some embodiments, system includes a LIDAR sensor that measures a distance from the LiDAR sensor to the object. Alternatively, or additionally, a system can include a pulsed illuminator and/or a gated video sensor. For example, when both are included the pulsed illuminator can be used in conjunction with a gated video sensor, as described herein, so that coordination of a pulse light round trip time with an activation of an optical shutter in a receiving video sensor can be accomplished.

A computing device embodiment of an alarm system can include a processor and memory, the memory having instructions executable by the processor stored therein, wherein the instructions are executable to receive monitoring data from an activated physical sensor of a physical alarm system detector device to monitor a space of a facility for a fire event to occur. The instructions can also define a virtual voxel structure mapped in at least three dimensions to a virtual monitored space created to represent the space of the facility being monitored and locate a virtual object within the virtual voxel structure by mapping a virtual object location based on sensing a location of a physical object with the physical sensor within the space.

FIG. 4 is an example of multiple detectors of a fire alarm system in a space within a building having an object obscuring the sensing field in accordance with one or more embodiments of the present disclosure. In this example, multiple detectors (434-1 434-2) are utilized to sense objects 430 in the area (bounded by walls 431 and 432 and floor 433. Here, detector 434-1 is sensing in area 436-1 and detector 434-2 is sensing in area 436-2. The combination of their sensing data significantly reduces the obscured area to 438 as compared to 338. Accordingly, adding additional detectors or sensor at dispersed location in the area with sensing directed toward an object can increase effectiveness of the fire alarm system.

In some embodiments, the computing device can have executable instructions to reduce a size of an occluded area associated with a particular object in the space by utilizing sensor data from multiple sensors place in at least two locations that are different with respect to the object. For example, in some embodiments, the sensor data from multiple sensors includes sensor data from another physical alarm system detector device positioned within the space or in other embodiments, the sensor data from multiple sensors includes sensor data from another sensor associated with (e.g., connected wired or wirelessly) the detector device 334.

One problem that needs to be overcome with this approach is the coordination of the multiple detectors and the combining of their data into one correctly registered voxel array representation. In one method for this to occur, it can be assumed that there is a 'master' detector in bi-directional communication with other detectors. For the example of FIG. 4, two detectors (more are permissible) coordinate their measurements through identification of landmarks in the scene (the sensed area as sensed by that particular detector), which may be for example, 3D structures such as corners or other objects.

The landmark information may be transmitted from any detector (e.g., detector 434-2) to the 'master' detector (e.g., 434-1) so that the master detector can compare with the data it already has and perform a transformation (e.g., three physical dimension plus time) into its local coordinate system.

Once the transformation of non-master detector's coordinates into the master detector's coordinate system is complete, then thereafter, the master detector can absorb voxel information from all non-master detectors and correctly combine it with local (master) voxel data to provide a more complete representation of the volume being monitored, with fewer occlusions.

Alternatively, if multiple detectors are used to monitor an area, they can be implemented so that there is no individual 'master'. This allows for redundancy should any part fail.

Figure 5:
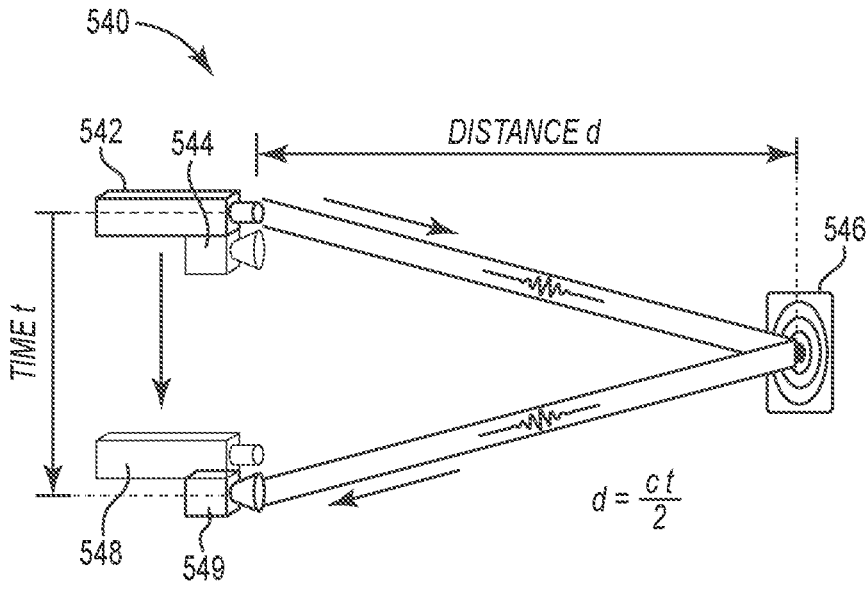
FIG. 5 is an example of system input and output devices of a fire alarm system in accordance with one or more embodiments of the present disclosure.

FIG. 5 is an example of system input and output devices of a fire alarm system in accordance with one or more embodiments of the present disclosure. This aspect of the detector is comprised of a pulsed light source which may cast light over a broad area. In this example, the pulsed illuminator system 540 (component 108 of FIG. 1) includes a light source shown at two periods of time 542 and 548 and a receiver (e.g., a video sensor) 544 and 549 at two periods of time.

The light source 542 is pulsed, meaning that, on command, it generates a very brief flash of light which may have a duration of, for example, a few nanoseconds. The light pulse is reflected back from objects 546 in its field of projection and these reflections may be received by a video sensor placed close to the light source.

The receiver can have a very fast shutter which can be operated on command. If time between the command to generate the light pulse and the command to open the shutter corresponds to the round-trip time for light to reflect off an object and return to the video sensor, then that object will be visible and other objects in the scene will not be. Such an arrangement can be determined through the equation d=(ct)/2, where d is the distance shown, c is a constant, and t is the travel time from 542 to 549.

In such embodiments, the pulsing of the light combined with the timing of the shutter allows for the video sensor components to capture images at different distances from the video sensor, thereby allowing for the location and distance of an object in the field of view of the image sensor to be determined. Such an embodiment can also be tuned to capture an image before the background surface is illuminated which may be beneficial where the background surface is not a high contrasting color to that of the smoke plume.

Figure 6:
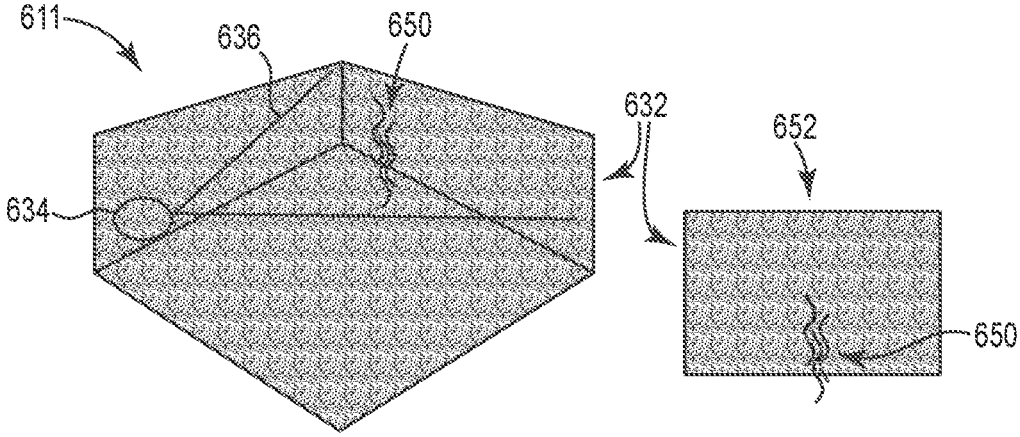
FIG. 6 is a view of smoke sensing device sensing a light colored smoke plume against a dark colored background in accordance with one or more embodiments of the present disclosure.

FIG. 6 is a view of smoke sensing device sensing a light colored smoke plume against a dark colored background in accordance with one or more embodiments of the present disclosure. One of the challenges to video smoke detection is that, if there is little or no contrast between the color and reflectivity of a smoke plume compared to the background, it is difficult for a standard video system to identify it.

However, if there is strong contrast, as shown in FIG. 6, a good image of the plume can be obtained and the plume identified without problem. FIG. 6 is a view of a light colored smoke plume against a high contrasting dark background using a standard video camera as detector 634. In this example, a detector 634 is sensing 636 in an area 611 and detects an object 650 (smoke plume) contrasted against a background 652 (wall 632). The monitoring data can be received from the activated physical sensor that includes a background surface that contrasts with the object in a foreground of the background surface, as illustrated in the embodiment of FIG. 6.

Figure 7:
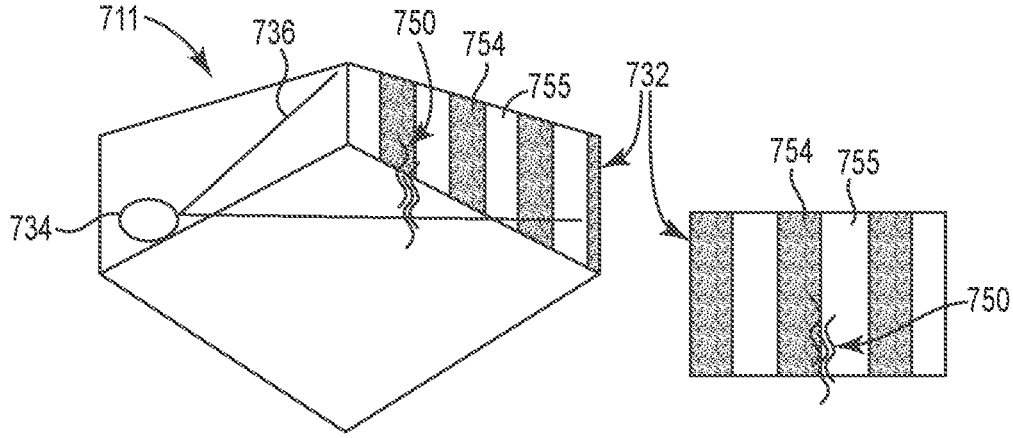
FIG. 7 is a view of smoke sensing device sensing a light colored smoke plume against a patterned background in accordance with one or more embodiments of the present disclosure.

FIG. 7 is a view of smoke sensing device sensing a light colored smoke plume against a patterned background in accordance with one or more embodiments of the present disclosure. In this example, if the contrast is poor, or the background has some parts that match the plume color and reflectivity, then the plume will become at least partly invisible or camouflaged. FIG. 7 is a view of a light colored smoke plume against a patterned or non-contrasting background using a standard video camera as detector 734.

In FIG. 7, the detector 734 is sensing 736 an object 750 in area 711, but the background (wall 732) contains high contrast areas 754 and low contrast areas 755. The low contrast between the object 750 and the low contrast areas 755 can make it difficult for the detector to accurately determine the size and location of the object 750.

Figure 8:
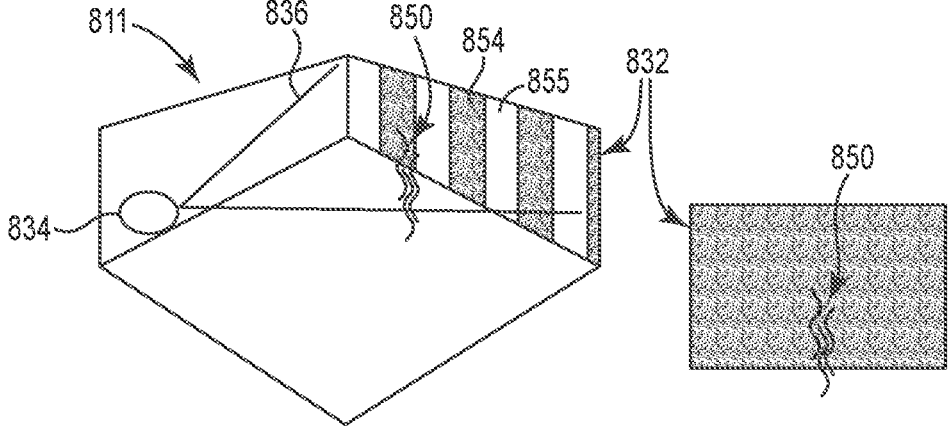
FIG. 8 is a view of smoke sensing device sensing a light colored smoke plume against a patterned background using a time gated video sensor and pulsed illuminator in accordance with one or more embodiments of the present disclosure.

FIG. 8 is a view of smoke sensing device sensing a light colored smoke plume against a patterned background using a time gated video sensor and pulsed illuminator in accordance with one or more embodiments of the present disclosure. In some embodiments, view of light-colored smoke plume against a patterned non-contrasting background using a time-gated video sensor and pulsed illuminator, also known as a time-of-flight sensor. The time between the pulsed light source activation and sensor shutter open time corresponds to the time taken for the light pulse to reach the plume and for the resulting light reflection to be detected by the sensor. By using time-gated video, as described herein, the smoke plume can be isolated from the background by controlling the delay between the onset of the illuminating pulse of light from the light source of the detector 834 and the time that the receiving shutter is opened also at detector 834 in this implementation.

One of the novel aspects of embodiments of the present disclosure include that: data outputs are configured as 3D+time coordinated voxel arrays. This is different from standard measurement systems which simply cast depth or thermal information onto a 2-dimensional (x, y) representation. Another aspect is the use of a combination of multiple sources of voxel data (from multiple detectors) to overcome an occlusion problem created through use of less detectors and to provide a comprehensive (almost complete) representation of the space being monitored, with this representation being formed in at least one (e.g., master) detector and transmitted as a complete voxel array to a separate monitoring system which will interpret the significance of the contents of the voxel array. Further, the use of time-gated (time-of-flight) video and pulsed illumination in a event detection is a novel concept. Additionally, the use of more than one of the technologies, mentioned above, can ensure a much higher likelihood of detecting an event.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method, comprising:

activating a first physical sensor of a physical alarm system master detector device to monitor a space of a facility for a fire event to occur from a first angle, wherein the first physical sensor is a light detection and ranging technology (LiDAR) system component configured to detect back-scatter from smoke;

activating a second physical sensor of another physical alarm system detector device to monitor the space of the facility for the fire event to occur from a second angle, wherein the second physical sensor is a receiving video sensor configured to detect smoke plumes or flames;

activating a third physical sensor of either of the master detector device or the other physical alarm system detector device, wherein the third physical sensor includes a gated video sensor component having a pulsed illuminator with an optical shutter;

activating a fourth physical sensor of either of the master detector device or the other physical alarm system detector device, wherein the fourth physical sensor includes a thermography component configured to detect a temperature of a physical object;

defining a virtual voxel structure mapped in at least three dimensions to a virtual monitored space created to represent the space of the facility being monitored based on inputs received from both of the master detector device and the other physical alarm system detector device, wherein the virtual voxel structure includes a plurality of adjacent cube-shaped voxels;

locating a virtual object and identifying at least one of the plurality of voxels affected by the virtual object within the virtual voxel structure by mapping a virtual object location based on sensing a location of the physical object with the first physical sensor, the second physical sensor, the third physical sensor, and the fourth physical sensor within the space; and transmitting the virtual voxel structure and the virtual object location as a voxel array data set to a monitoring station of a separate alarm system for interpretation.

2. The method of claim 1, wherein the method further includes monitoring the space over time and adjusting the location of the virtual object based on a sensed change in the location of the physical object.

3. The method of claim 1, wherein each voxel is described by its location in three dimensions as well as having a dimension of time.

4. The method of claim 3, wherein the time dimension is quantified by a time at which voxel data for a particular voxel is sensed by the first physical sensor.

5. The method of claim 1, wherein the method further includes coordinating a pulse light round trip time from the pulsed illuminator with an activation of the optical shutter in the gated video sensor component.

6. The method of claim 1, further comprising, receiving data from a structured light triangulation system component that detects back-scatter from smoke.

7. An alarm system, comprising:

a number of physical alarm system detector devices having a number of sensors configured to detect an event within a facility, including a first physical sensor of a first physical alarm detector device at a first angle with respect to the facility, a second physical sensor of a second physical alarm detector device at a second angle with respect to the facility, a third physical sensor and a fourth physical sensor of either the first or second physical alarm device, wherein:

the first physical sensor is a light detection and ranging technology (LiDAR) system component configured to detect back-scatter from smoke;

the second physical sensor is a receiving video sensor configured to detect smoke plumes or flames;

the third physical sensor includes a gated video sensor component having a pulsed illuminator with an optical shutter;

the fourth physical sensor includes a thermography component configured to detect a temperature of a physical object; and an alarm system control panel including a first processor and a first memory, the first memory having instructions executable by the first processor stored therein, wherein the instructions are executable to receive information about the event or alarm system detector devices and transmit the information to a computing device;

wherein the computing device includes a second processor and a second memory, the second memory having instructions executable by the second processor stored therein, wherein the instructions are executable to:

activate the first, second, third, and fourth physical sensors to monitor a space of a facility for a fire event to occur;

define a virtual voxel structure mapped in at least three dimensions to a virtual monitored space created to represent the space of the facility being monitored based on inputs received from both of the first and second physical alarm detector devices, wherein the virtual voxel structure includes a plurality of adjacent cube-shaped voxels;

locate a virtual object and identify at least one of the plurality of voxels affected by the virtual object within the virtual voxel structure by mapping a virtual object location based on sensing a location of the physical object with the first physical sensor, the second physical sensor, the third physical sensor, and the fourth physical sensor within the space; and transmit the virtual voxel structure and the virtual object location as a voxel array data set to a monitoring station of a separate alarm system for interpretation.

8. The system of claim 7, wherein the LiDAR system component measures a distance from the LiDAR system component to the object.

9. The system of claim 7, wherein the system includes a pulsed illuminator and wherein the pulsed illuminator is used in conjunction with the gated video sensor component so that a coordination of a pulse light round trip time with an activation of an optical shutter in a receiving video sensor is accomplished.

10. The system of claim 7, wherein the system includes a pulsed illuminator.

11. An alarm system computing device, comprising:

a processor and memory, the memory having instructions executable by the processor stored therein, wherein the instructions are executable to:

receive monitoring data from an activated first physical sensor of a first physical alarm system detector device to monitor a space of a facility for a fire event to occur from a first angle;

receive monitoring data from an activated second physical sensor of a second physical alarm system detector device to monitor the space of the facility for the fire event to occur from a second angle;

receive monitoring data from an activated third physical sensor of either of the first physical alarm system detector device or the second physical alarm system detector device, wherein the third physical sensor includes a gated video sensor component having a pulsed illuminator with an optical shutter;

receive monitoring data from an activated fourth physical sensor of either of the first physical alarm system detector device or the second physical alarm system detector device, wherein the fourth physical sensor includes a thermography component configured to detect a temperature of a physical object;

define a virtual voxel structure mapped in at least three dimensions to a virtual monitored space created to represent the space of the facility being monitored based on inputs received from both of the first physical alarm system detector device and the second physical alarm system detector device, wherein the virtual voxel structure includes a plurality of adjacent cube-shaped voxels;

locate a virtual object and identify at least one of the plurality of voxels affected by the virtual object within the virtual voxel structure by mapping a virtual object location based on sensing a location of the physical object with the first physical sensor, the second physical sensor, the third physical sensor, and the fourth physical sensor within the space; and transmit the virtual voxel structure and the virtual object location as a voxel array data set to a monitoring station of a separate alarm system for interpretation.

12. The device of claim 11, wherein the executable instructions include instructions to reduce a size of an occluded area associated with a particular object in the space by utilizing sensor data from multiple sensors place in at least two locations that are different with respect to the object.

13. The device of claim 11, wherein the monitoring data includes a background surface that contrasts with the object in a foreground of the background surface.

\* \* \* \* \*